Figure 1:
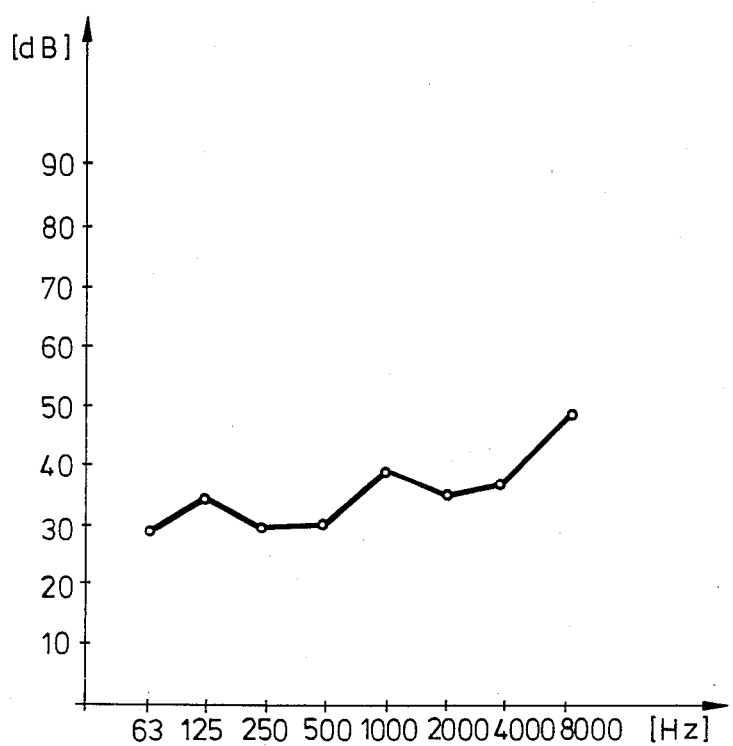

United States Patent [19]

Gyurkó et al.

[11] Patent Number: 4,544,676
[45] Date of Patent: Oct. 1, 1985

[54] SOUND-INSULATING LEATHER POWDER COMPOSITIONS

[75] Inventors: István Gyurkó; Csaba Czeininger; Károly Moskó; Ferenc Nagy, all of Pécs, Hungary

[73] Assignee: Mecseki Szénbányák, Pécs, Hungary

[21] Appl. No.: 599,903

[22] Filed: Apr. 13, 1984

[30] Foreign Application Priority Data

Apr. 20, 1983 [HU] Hungary ................................ 1365/83

[51] Int. Cl.⁴ .............................................. C08J 9/00
[52] U.S. Cl. ...................................... 521/84.1; 524/10; 524/11; 521/102; 521/181; 521/187; 521/188
[58] Field of Search ................ 521/84.1, 181, 187, 521/188, 102; 524/10, 11

[56] References Cited

U.S. PATENT DOCUMENTS

| | | | |
|---|---|---|---|
| 1,263,297 | 4/1918 | Vargyas | 524/10 |
| 1,719,802 | 7/1929 | Ferretti | 524/10 |
| 2,373,401 | 4/1945 | King | 521/102 |
| 2,601,671 | 6/1952 | Wilson et al. | 524/11 |
| 2,798,054 | 7/1957 | Simon et al. | 521/102 |
| 3,986,988 | 10/1976 | Sedlak et al. | 521/102 |

*Primary Examiner*—Morton Foelak
*Attorney, Agent, or Firm*—Gabriel P. Katona

[57] ABSTRACT

The invention relates to new sound- and heat-insulating compositions, which comprise a finely dispersed leather powder of animal origin, a phenoplast resin or an aminoplast resin and optionally, together with the latter one, urea and/or a modified furane resin and optionally a wetting and/or foaming agent and an acid catalyst and optionally water.

The compositions according to the invention have remarkable noise- and heat-insulating properties.

10 Claims, 3 Drawing Figures

SOUND-INSULATING LEATHER POWDER COMPOSITIONS

The invention relates to new leather powder compositions. More particularly, the invention concerns micro-and/or macroporous, sound-insulating hide powder compositions, which are, after solidification, suitable for coating noisy machines or equipments or can be used as building elements. The new compositions can be applied in the form of thin layers or plates. Due to their low surface weight, the leather powder compositions provided by the invention can be utilized as sound-proofing panels, too.

As a direct consequence of technical development the number and power of various machineries is increasing rapidly, which results in an enormous increase in the number and intensity of noise sources. Among the recent environmental problems noise emission is one of the most difficult ones to solve. The industrial sound insulation cannot keep abreast of the increase of noise level. The noise should be limited in place of its origin, instead, generally the inhibition of its transmission is attempted. This is clearly reflected by the patents in this field, which generally relate to solutions inhibiting sound transmission.

A common disadvantage of most of the sound-proofing materials is that they are too thick and have a high surface weight. For example according to the Hungarian Patent Specification No. 165,514 the attention of constructors is more and more attracted by constructions having a surface weight of about 100 kp./m$^2$ and the surface weight of 50 kg./m$^2$ according to the disclosed invention is considered a great technical development. The thinner and lighter plates disclosed in other patents, e.g. in the Hungarian Patent Specification No. 169,847 cannot be used as independent structural elements.

In the everyday practice noise and heat insulation problems go together, therefore it is desireable to use materials which have both good sound- and heat-insulating properties. According to a universal and wrong belief, if a porous, synthetic foam is a good heat-insulator, it is thought to meet automatically the requirements of sound-proofing, and therefore it is used for such purposes without any further consideration. In fact, the synthetic foams, for instance are capable of filtering out only a very narrow frequency range. For example according to Leo L. Beranek [Noise Reduction—Hungarian translation: Zajcsökkentés, Müszaki Kiadó, Budapest, 1967, p. 327] the 1.5 to 2.5 cm thick porous materials are less effective noise filters in the low frequency range.

The purpose of the present invention is to provide a new composition which, in the form of thin layers or plates, has both good noise reducing and heat insulating properties. The outstanding insulating properties are achieved by means of a new chemical composition and not by the increase of the thickness of plates or layers.

We have experimentally found that if a finely dispersed leather powder of animal origin, e.g. leather powder produced during the processing of cattle or pig hide is combined with aminoplast or phenoplast synthetic resin or modified derivatives thereof, new materials are obtained, which have specific, practically utilizable properties. more particularly, the combination results in a new, solid, microporous material having a good retentivity, which may contain optionally macropores, as well.

In contrary to the known materials (see L. L. Beranek above), the foamed, porous plates prepared from the leather powder composition according to the invention have good noise reducing properties even in the low frequency range, and at the same time, are efficient heat insulators.

The combination of leather powder and synthetic resins gives a stable, rapidly solidifying material, which has a homogenous microstructure. In addition to its relatively high strength, the material has a flexible microstructure as shown by the results of compressive strength measurements. It has namely been found that the targets were compressed by about 10% before fracture. The microporous structure of the plates cannot be observed visually but is clearly visible under microscope or scanning electron microscope.

FIG. 1 illustrates the sound insulation, achieved by a test plate prepared according to Example 1 of the invention, as a function of frequency. The plate is relatively thin (thickness: 10 mm) and has a low surface weight (13 kg./m$^2$).

The compositions according to the invention may be formulated in a compact or foamed form.

The foamed synthetic resin-leather powder composition has a macropore, porous structure, which is suitable for the absorption of low- and high-frequency noises. The size of the micropores of the compact variant is between 5.0 to 25.0μ, preferably about 10μ. The pore size of the foamed variant generally varies between 0.2 and 15.0 mm, preferably 2 and 4 mm.

The compositions according to the invention essentially consist of a leather powder, phenoplast or aminoplast synthetic resin, acid catalyst, optionally wetting agent and/or foaming agent and optionally water. The compositions may optionally contain together with the aminoplast resin a modified furane resin as well.

According to a preferred embodiment, the invention relates to a leather powder-synthetic resin composition, which comporises 1 to 17% by weight of a leather powder of animal origin, 75 to 85% by weight of a phenol-formaldehyde resin or 40 to 55% by weight of an urea-formaldehyde resin and optionally, together with the latter one, 10 to 15% by weight of urea and/or 5 to 7% of a modified furane resin, and optionally 1 to 4% by weight of a wetting agent and/or 1 to 4% by weight of a foaming agent and 5 to 8% by weight of an acid catalyst and water ad 100%.

According to another preferred embodiment of the invention a phenol-formaldehyde resin is employed. In this case the composition comprises 1 to 17% by weight of a leather powder of animal origin, 75 to 85% by weight, preferably 82% by weight of a phenol-formaldehyde resin, optionally 2 to 3% by weight of a foaming agent and 5 to 6% by weight of 10% by weight phosphoric acid.

Of the components of the composition according to the invention leather powder is a by-product of leather manufacturing [see Dr. Vermes: "A nyersbőrtől a kiké szitésig" ("From the raw leather until the finishing") Müszaki Kiadóo, Budapest, 1983, II. p. 39]. According to this publication the nubuck hide is buffed on the grain size, the buffed leather on the flesh (skived) side. The naps are the finer the more compact the fibre structure is and the younger the animal is. If the buffed leather is produced from split leather, the grain size of the splits is buffed.

The hide powder is characterized in a fine, fibrillary structure. The elementary fibrils have a diameter of about 0.2 to 0.8μ and are about 5 to 15μ long. The leather powder contains also traces of abrasive powder grains of 3 to 4μ.

Calf hide, cattle hide, kid leather and pig leather powder is equally suitable for the preparation of the instant compositions. The powder must be dry and its abrasive powder contamination must not exceed 5% by weight. Under these conditions the volume weight of the leather powder is about 0.05 to 0.08 g./cm$^3$.

As an aminoplast resin preferably an urea-formaldehyde resin is used. Resins of commercial quality can be directly utilized for preparing the compositioons according to the invention (e.g. Amicol 65—manufactured by Nitrokémia Ipartelepek, Hungary, Arbocol-1—manufactured by Egyesült Vegyimüvek, Hungary, Plastopal—a modified urea resin of BASF, FRG, Aerolite and Melocol H-products of CIBA AG, Kaurit and Iporka—manufactured by BASF, Mono—manufactured by British Tego Gluefilm Ltd., Plyamin—a product of Reichhold Chemicals Co., USA, Urac—manufactured by American Cyanamid Co., USA or Welwood—produced by US Polywood Corp., USA).

As a phenoplast resin preferably a phenol-formaldehyde resin is used, which has a conventional commercial quality. Preferred phenoplast resins include Rezofén MF—produced by Egyesült Vegyimüvek, Hungary, Deresit—produced by Kreidl-Rutter Co., Austria, Cardolite—produced by Irvington Varnish Insulator Co., USA, Canevasite—produced by Isola, Italy, Laoxite—produced by Monsanto Chemical Co., USA, Resinit—produced by Bakelite GmBH, FRG, and Tego—produced by Rohm and Haas Co., USA. The modified furane resins are of conventional, commercial quality, e.g. Furfén H3—produced by EgyesüVegyimüvek, Hungary.

The quantities of resins all over the specification and claims are expressed in the amount of resins containing 50% of dry substance.

As a foaming substance for example alkali metal salts of unsaturated fatty acids, alkyl sulfates or isocyanates containing from 12 to 14 carbon atoms, e.g. an aminoalcoholic alkyl sulfate or alkylphenol polyethyleneglycolether, sold by Egyesült Vegyimüvek, Hungary under the trade name EVAM or any other neutral or slightly acidic foaming agents can be employed. The wetting substance preferably is a non-ionic surface active agent, e.g. a sodium salt of alkyl naphthalene sulfonic acid, sold by Buna, GDR under the trade name Prawozell.

When using the leather powder-synthetic resin compositions according to the invention condensation is generally carried out in the presence of an acid catalyst, preferably phosphoric acid, hydrochloric acid, toluene sulfonic acid or ammonium chloride, most preferably phosphoric acid.

The combination containing the catalyst may be used directly as a coating applied to the desired surface or may be filled into a mould. Condensation is initiated in 10 minutes, and generally is complete in about 30 to 60 minutes at room temperature.

Solidification takes place over +10° C.

The composition according to the invention has the following essential properties:

(a) It has more favourable physical properties than the original synthetic resins.

(b) The compact leather powder compositions, due to their microporous structure, have good sound-proofing properties.

Their sound insulation is 45 to 50 dBA in the high frequency range, 35 to 40 dBA in the medium frequency range and 28 to 35 dBA in the low frequency range. The sound insulation of 28 to 32 dBA at 63 Hz is particularly remarkable. The mean value of sound insulation is about 34 to 36 dBA.

For example the foamed leather powder composition according to Example 7, due to its porous structure, is excellent sound- and heat-insulator. In the acoustic laboratory of the Central-Research and Design Institute for Silicate Industry (SZIKKTI) at 250 Hz a 20%, at 500 Hz a 50% and at 1 kHz a 90% sound absorption was measured. According to the same institute the thermal conductivity amounted to 0.0537 W/mk, which corresponds to good heat insulating properties.

(c) The excellent noise reduction is a result of the specific structure and inner flexibility of the material.

(d) The compositions are non-inflammable and have self-quenching properties.

(e) They are resistant to water, therefore can be used in wet places, too.

(f) The compact compositions, due to their compression strength of 12.7 N/mm$^2$. can be used as a covering or separating panel even in the form of as thin plates as 15 mm.

(g) Since the leather powder is an industrial waste material, the production costs of the compositions according to the invention are very low. At the same time, the problems connected with the waste material disposal can also be solved by utilizing the waste as a secondary industrial basic material.

The leather powder-synthetic resin compositions according to the invention are suitable for covering motor vehicles, diesel and electric locomotives, ship engines, electric works equipments, mining machines, machines in machine works, machines of building industry, etc. In this way the noise level of these machines can substantially be reduced.

The acoustic measurements were carried out according to the Hungarian Standard MSZ No. 18154, while the sound absorption coefficient was determined according to the works standard No. 232 of the Building Quality Testing Institute (Épitésügyi Minőségvizsgáló Intézet), Hungary. The heat absorption coefficient was measured according to the Hungarian Standard MSZ No. 4674/2.

Further details of the invention are to be illustrated by the following, non-limiting Examples.

EXAMPLE 1

Preparation of a Microporous Noise-reducing Material

| | |
|---|---|
| pig leather powder | 6.0 kg. |
| Amicol-65 urea-formaldehyde resin (Nitrokemia Ipartelepek) | 47.0 kg. |
| urea (granulated, 40%, technical grade) | 14.0 kg. |
| an aminoalcoholic alkyl sulfonate or alkylphenol polyethyleneglycolether sulfate, foaming substance (Egyesult Vegyimuvek) | 3.0 kg. |
| water | 25.5 lit. |
| phosphoric acid (10%, technical grade) | 4.5 lit. |

The above ingredients are homogenized by stirring at 20–30 rpm. at 20° to 30° C. for 10 minutes. Condensation starts within 10 minutes after pouring out the mixture, and solidification is complete in one hour. The sound-proof material obtained has a microporous structure with a pore size of 10 to 15μ and a compressive strength of 12.3 N/mm². The composition is advantageous in that it can be compressed by about 30 to 50% before fracture, i.e. has a high inner flexibility. The sound insulation as a function of frequency is illustrated on FIG. 1 referred to hereinbefore. The mean sound insulating coefficient of a 15 mm thick plate is 34.4 dBA.

EXAMPLE 2

Preparation of a Microporous Noise-reducing Material

| | |
|---|---|
| cattle leather powder | 7.0 kg. |
| Amicol-65 urea-formaldehyde resin (Nitrokemia Ipartelepek) | 46.0 kg. |
| urea (granulated, 40% technical grade) | 14.0 kg. |
| an aminoalcoholic alkyl sulfonate or alkylphenol polyethyleneglycolether sulfate-B foaming agent (Egyesult Vegyimuvek) | 3.0 kg. |
| phosphoric acid (10%, technical grade) | 5.0 lit. |
| water | 25.0 lit. |

The above ingredients are homogenized by stirring at 20 to 30 rpm. at 20° to 30° C. for 10 minutes. Condensation starts about 8 minutes after pouring out the mixture, and solidification is complete in about 45 minutes.

The pore size of the material obtained is between 8 and 10μ. Its sound-proofing properties are better than those of the product of Example 1, especially in the low frequency range. The mean sound insulating coefficient of a 20 mm thick plate is 36.4 dBA.

EXAMPLE 3

Microporous Sound-proofing Material

| | |
|---|---|
| pig leather powder | 13.0 kg. |
| Phenol-formaldehyde resin | 78.0 kg. |
| an aminoalcoholic alkyl sulfonate or alkylphenol polyethyleneglycolether sulfate, foaming agent | 3.0 kg. |
| phosphoric acid (10%, technical grade) | 6.0 lit. |

The above ingredients are homogenized at 30 to 50 rpm. at 20° to 30° C. for 15 minutes. Condensation starts about 8 to 10 minutes after pouring or blowing out the mixture and solidification is complete in 2 hours. The porosity of the hide powder-synthetic resin composition obtained is smaller than that of the previous compositions, the pore size is between 6 and 8μ. The mean sound insulating coefficient of a 15 mm thick plate is 30.1 dBA, i.e. is somewhat lower than that in case of the compositions according to Example 1 or 2.

EXAMPLE 4

Microporous Sound-proofing Material

| | |
|---|---|
| pig leather powder | 1.0 kg. |
| Amicol-65, urea-formaldehyde resin (Nitrokemia Ipartelepek) | 47.0 kg. |
| urea (granulated, 40%, technical grade) | 13.0 kg. |
| wetting agent, sodium salt of alkyl naphthalene sulfonic acid (Buna, GDR) | 3.0 lit. |
| water (pH = 7) | 30.0 lit. |
| phosphoric acid (10%, technical grade) | 6.0 lit. |

The above ingredients are homogenized at 20–30 rpm., at 20° to 30° C. for 5 minutes. Condensation starts 10 minutes after pouring out the mixture, and solidification is complete in about 40 minutes. Pore size: 5 to 6μ. Mean sound insulating coefficient of a 15 mm thick plate is 28.5 dBA.

EXAMPLE 5

Microporous Sound-proofing Material

| | |
|---|---|
| cattle leather powder | 16.0 kg. |
| Amicol-65, urea-formaldehyde resin (Nitrokemia Ipartelepek) | 40.0 kg. |
| urea (granulated, 40%, technical grade) | 11.0 kg. |
| EVAM, foaming agent (Egyesult Vegyimuvek) | 3.0 lit. |
| phosphoric acid (10%, technical grade) | 5.0 lit. |
| water (pH = 7) | 25.0 lit. |

Figure 2:
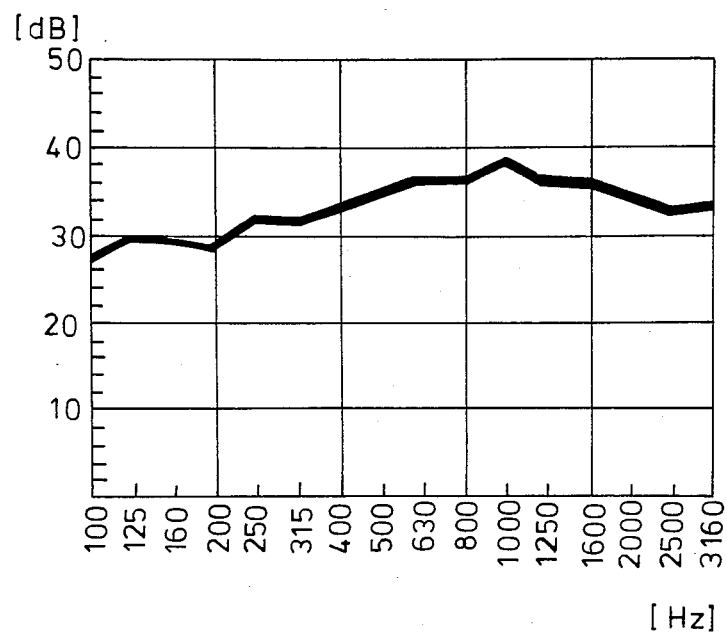

The above ingredients except phosphoric acid and water are homogenized at 50 to 60 rpm., 20° to 30° C. for 15 minutes and catalyzed in the 10th minute with the diluted phosphoric acid. Condensation starts 5 to 6 minutes after pouring out the mixture, and solidification is complete in 30 to 40 minutes. The pore size of the composition obtained is between 15 and 20μ. The mean sound insulating coefficient of a 25 mm thick plate is 33.57 dBA. The diagram is illustrated on FIG. 2.

EXAMPLE 6

Microporous Sound-proofing Material

| | |
|---|---|
| pig leather powder | 4.0 kg. |
| Amicol-65, urea-formaldehyde resin (Nitrokemia Ipartelepek) | 52.0 kg. |
| urea (granulated, 40%, technical grade) | 13.0 kg. |
| sodium salt of alkyl naphthalene sulfonic acid wetting agent (Buna, GDR) | 3.0 lit. |
| phosphoric acid (10%, technical grade) | 5.0 lit. |
| water (pH = 7) | 23.0 lit. |

The above ingredients, except phosphoric acid and water, are homogenized at 30 to 40 rpm., 20° to 30° C. for 5 to 8 minutes, and catalyzed in the 4 to 6th minute with the diluted phosphoric acid. Condensation starts 6 to 8 minutes after pouring out the mixture and solidification is complete in 50 minutes. The pore size of the composition is about 8 to 10μ. The mean sound insulating coefficient of a 20 mm thick plate is 36.5 dBA.

EXAMPLE 7

Macroporous Sound-proofing Material

| | |
|---|---|
| cattle leather powder | 5.0 kg. |
| Amicol-65 urea-formaldehyde resin (Nitrokemia ipartelepek) | 44.0 kg. |
| urea (granulated, 40%) | 12.0 kg. |
| Carboxymethyl-Cellosolve (CMC) | 0.5 kg. |
| sodium salt of alkyl naphthalene sulfonic acid wetting agent (Buna, GDR) | 2.0 kg. |
| sodium hydrocarbonate | 1.5 kg. |
| phosphoric acid (10%, technical grade) | 5.0 lit. |
| water (pH = 7) | 30.0 lit. |

Figure 3:
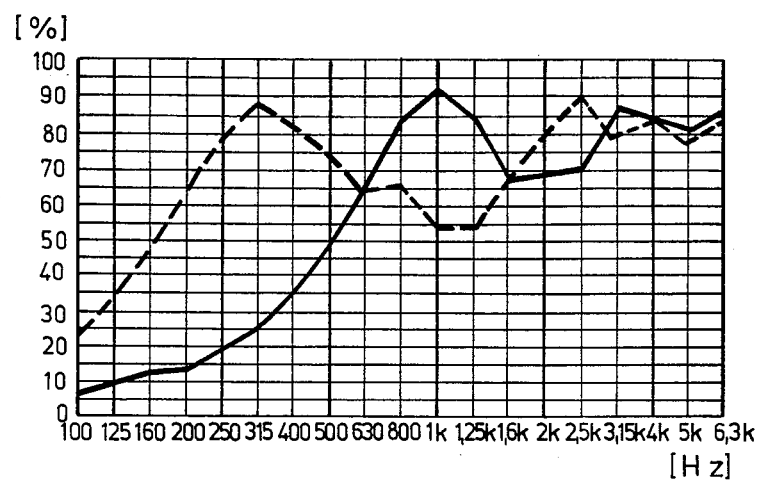

The above ingredients are first homogenized at a speed of 15 to 20 rpm, and then clouded at a higher speed of 200 to 300 rpm., at 20° to 30° C. for 5 minutes. The composition obtained has a macroporous structure, i.e. comprises pores of 5 to 8 mm. The sound absorbing capacity of a 20 mm thick plate of the material is illustrated on FIG. 3.

The continuous line refers to the above plate applied directly on the surface, the broken one to the same plate but applied leaving a 5 cm. air-space between the surface and the sound proofing plates.

EXAMPLE 8

Micro- and Macroporous Sound-proofing Material

| cattle leather powder | 3.0 kg. |
|---|---|
| modified furane resin, Furfen H3 (Egyesult Vegyimuvek) | 5.0 kg. |
| Amicol-65, urea-formaldehyde resin (Nitrokemia Ipartelepek) | 45.0 kg. |
| urea (granulated 40%) | 11.0 kg. |
| phosphoric acid (10%, technical grade) | 6.0 lit. |
| water (pH = 7) | 30.0 lit. |

The above ingredients are first slowly homogenized at a speed of 15 to 20 rpm., and then clouded at a higher speed of 200 to 300 rpm., at 20° to 30° C. for 45 to 47 minutes. The sound-proofing material obtained has a micro- and macroporous, spongy structure. Compression strength: 8 to 10 N/mm². Pore distribution: micropores of 10 to 12μ and macropores of 3 to 4 mm.

As clearly reflected by the Examples, the new material obtained according to the invention has excellent sound-proofing properties, accordingly is a new, original and useful product.

We claim:

1. Sound- and heat-insulating microporous and/or macroporous composition, which comprises a finely dispersed leather powder whose elementary fibrils have a diameter of about 0.2 to 0.8 microns and are about 5 to 15 microns long of animal origins, a phenol-aldehyde resin or a urea formaldehyde resin, and a wetting and/or foaming agent and an acidic catalyst.

2. A composition according to claim 1, further comprising urea and/or a modified furan resin.

3. A composition according to claim 1, further comprising water.

4. A composition according to claim 3, comprising 1 to 17% by weight of a leather powder of animal origin, 75 to 85% by weight of a phenol-formaldehyde or 40 to 55% by weight of an urea-formaldehyde resin, 1 to 4% by weight of a wetting agent and/or 1 to 4% by weight of a foaming agent, and 5 to 8% by weight of an acid catalyst, and water to make 100% by weight.

5. A composition according to claim 4, further comprising 10 to 15% by weight of urea and/or 5 to 7% by weight of a modified furane resin.

6. A composition according to claim 5, comprising 4 to 7% by weight of a leather powder of animal origin, 45 to 50% by weight of a urea formaldehyde resin, 11 to 14% by weight of urea, 5 to 6% by weight of 10% phosphoric acid, 2 to 3% by weight of a wetting and/or foaming agent, and water to make 100% by weight.

7. A composition according to claim 6, which comprises 4 to 7% by weight of a leather powder of animal origin, about 45% by weight of a urea-formaldehyde resin, about 5% by weight of a modified furane resin, 2 to 3% by weight of a wetting and/or foaming agent, 5 to 6% by weight of 10% phosphoric acid, and water to make 100% by weight.

8. A composition according to claim 1, comprising 1 to 17% by weight of a leather powder of animal origin, 75 to 85% by weight of a phenol-formaldehyde resin, 2 to 3% by weight of a foaming agent, and 5 6% by weight of 10% phosphoric acid.

9. A composition according to claim 8, wherein about 82% by weight of a phenol-formaldehyde resin is used.

10. A composition according to claim 1, which comprises a leather powder of a volume weight of 0.05 to 0.08 g/cm³.

* * * * *